United States Patent [19]

Razafimandimby et al.

[11] Patent Number: 5,228,328
[45] Date of Patent: Jul. 20, 1993

[54] DEVICE FOR MEASURING DIMENSIONS BY PNEUMATIC MEANS

[75] Inventors: André Razafimandimby; Francois Decool, both of Bayeux, France

[73] Assignee: Societe Industrielle De Liaisons Electriques-Silec, Paris, France

[21] Appl. No.: 904,008

[22] Filed: Jun. 24, 1992

[30] Foreign Application Priority Data

Jun. 26, 1991 [FR] France .................... 91 07877

[51] Int. Cl.⁵ .................................. G01B 13/00
[52] U.S. Cl. ................................ 73/37.5; 73/37.9
[58] Field of Search .................. 73/37.5, 37.9, 37.8

[56] References Cited

U.S. PATENT DOCUMENTS

| | | | |
|---|---|---|---|
| 3,065,628 | 11/1962 | Gesell | 73/37.9 |
| 4,088,009 | 9/1978 | Fukuda | 73/37.9 X |
| 4,538,449 | 9/1985 | Wegmann et al. | 73/37.9 |
| 5,163,232 | 11/1992 | Gonzales, Jr. et al. | 73/37.8 X |

FOREIGN PATENT DOCUMENTS

| | | | |
|---|---|---|---|
| 2700439 | 7/1978 | Fed. Rep. of Germany | 73/37.9 |
| 153207 | 9/1982 | Japan | 73/37.5 |
| 1430743 | 10/1988 | U.S.S.R. | 73/37.5 |
| 946518 | 1/1964 | United Kingdom | 73/37.5 |

OTHER PUBLICATIONS

Patent Abstracts of Japan vol. 11, No. 5 (P-533) (2452) Jan. 8, 1987 and JP-A-61 184 410 (Shiba Kazuo) Aug. 18, 1986.
Patent Abstracts of Japan vol. 6, No. 258 (P-163) (1136) Dec. 17, 1982 and JP-A-57 153 207 (Izuka Hiromichi) Sep. 21, 1982.

Primary Examiner—Hezron E. Williams
Assistant Examiner—Joseph W. Roskos
Attorney, Agent, or Firm—Griffin, Butler, Whisenhunt & Kurtossy

[57] ABSTRACT

The device comprises a source of gas under pressure, a measurement branch connected to the source of gas under pressure and including a feed nozzle and a measurement member, a measurement pressure sensor connected to the measurement branch between the feed nozzle and the measurement member, and an absolute pressure sensor connected to the source of gas under pressure and having an input connected to a reference electricity source and an output connected to an input of a differential amplifier having another input connected to the reference electricity source and an output connected to the power supply terminal of the measurement pressure sensor.

4 Claims, 1 Drawing Sheet

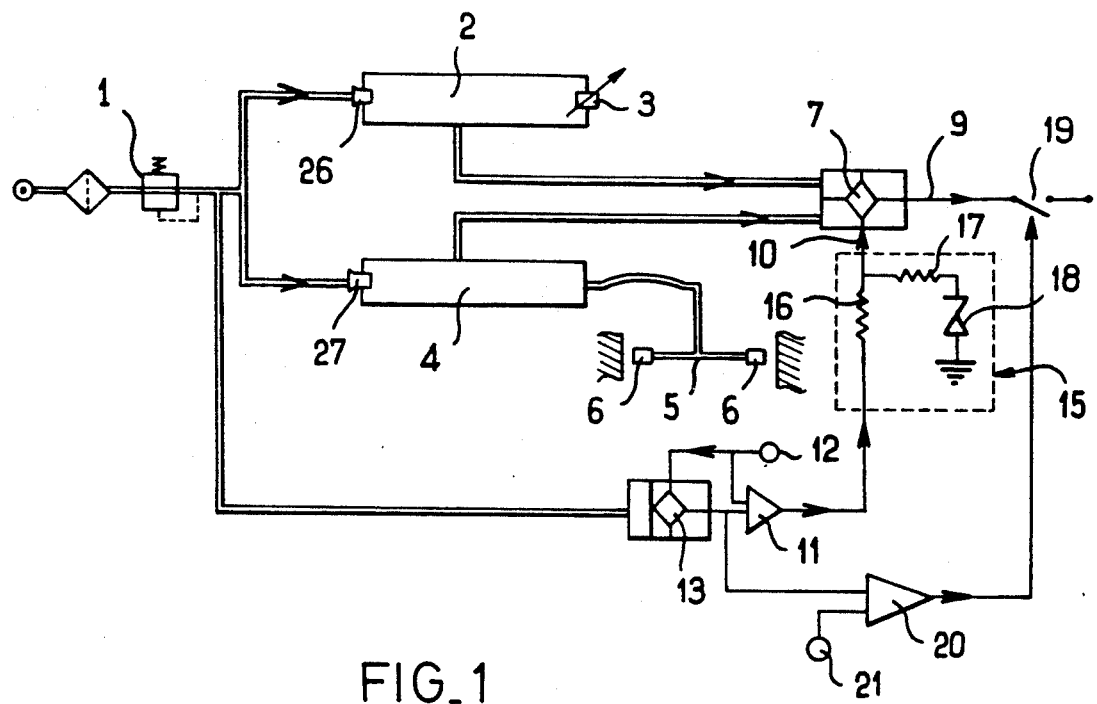
FIG_1
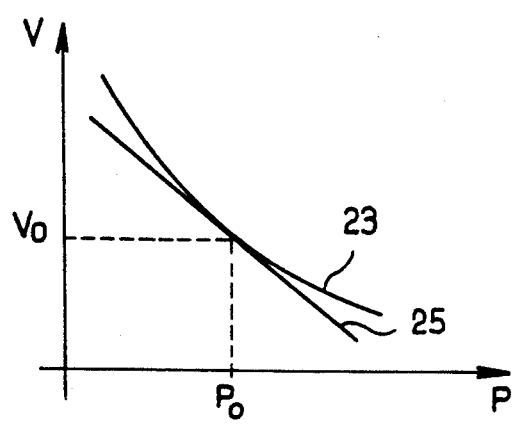
FIG_2
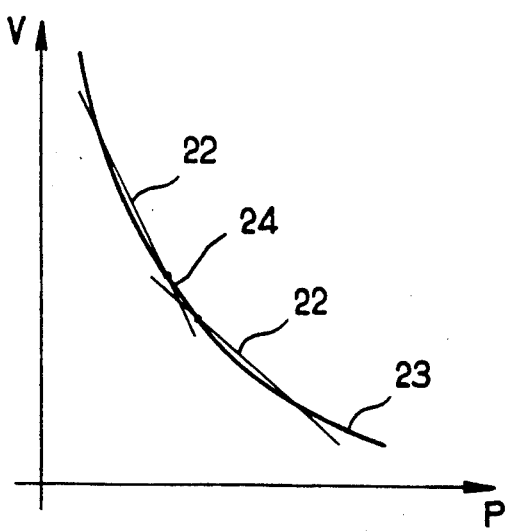
FIG_3

DEVICE FOR MEASURING DIMENSIONS BY PNEUMATIC MEANS

The present invention relates to a device for measuring dimensions by pneumatic means.

BACKGROUND OF THE INVENTION

Devices for measuring dimensions by pneumatic means are known that comprise a source of gas under pressure, a measuring branch connected to the source of gas under pressure and including a feed nozzle and a measuring member, and a pressure sensor associated with the measuring branch between the feed nozzle and the measuring member for the purpose of delivering an electrical signal. The pressure read by the pressure sensor is representative of the distance between the object to be measured and the measuring member. Unfortunately, the pressure sensed by the pressure sensor also depends on the feed pressure from the gas source, such that variations in said pressure spoil the measurement. To compensation for variations in the pressure of the gas source, devices have been made that further include a reference branch comprising an admission nozzle and a calibrated leak, a differential pressure sensor being connected to the measurement branch and to the reference branch.

The advantage of performing the measurement by means of a differential pressure sensor disposed between a reference branch and a measurement branch is that the consequences of variations in the feed pressure are reduced. Measurement is performed initially by calibrating the apparatus, i.e. by adjusting both the zero of the associated electronic device and the leakage section of the reference branch so that the pressure difference is zero when a standard piece having dimensions exactly equal to the looked-for dimensions in pieces to be checked is placed facing the measurement member. When a piece to be checked is inserted in the measurement device the pressure difference measured by the differential pressure sensor is proportional to the dimensional difference between the piece to be checked and the standard piece.

When the feed pressure of the device varies, the pressures in the measurement branch and in the reference branch change in the same direction so that their difference provides some compensation for the variations in the feed pressure. However, this compensation is partial only, and the relative error obtained on the dimensional difference is proportional to the relative variation in the absolute pressure of the feed. The effectiveness of the compensation thus diminishes as the measurement pressure departs from the initial pressure in the reference branch. In practice, that means that the greater the error in the piece to be checked relative to the required dimension, the more the measurement is sensitive to differences in feed pressure. This constitutes a major drawback since it is precisely when close to the acceptable limit tolerance on a piece that it is desirable to have the greatest accuracy in determining whether the piece can be retained or must be rejected.

It is also known that the voltage delivered at the output of the pressure sensor is proportional to the feed pressure of the device. Proposals have thus been made to divide the output signal from the measurement transducer electronically by a signal representative of the absolute feed pressure by generating said signal with a pressure sensor associated with a pressure gauge measuring the absolute feed pressure at the inlet to the device. However, electronically dividing one signal by another signal is an operation that is difficult to perform and that is of doubtful reliability.

It has also been observed that the output voltage of the pressure sensor is proportional to the power supply voltage applied to the pressure sensor itself. An ideal solution for making the measurement independent of the feed pressure would thus consist in keeping constant the product of the power supply voltage to the pressure sensor multiplied by the feed pressure to the measurement device. This equation is represented by a curve that is a hyperbola on a graph where the power supply voltage to the pressure sensor is plotted relative to the feed pressure to the device, and it could be satisfied by making the power supply voltage to the pressure sensor vary in a manner that is inversely proportional to the variation in the feed pressure to the measurement device. This would nevertheless be equivalent to performing electronic division with the problems outlined above.

An object of the present invention is thus to correct variations in feed pressure by replacing the above-mentioned hyperbola with an approximate curve that is easily implemented electronically.

SUMMARY OF THE INVENTION

To achieve this object, the present invention provides a device for measuring a dimension by pneumatic means, the device comprising a source of gas under pressure, a measurement branch connected to the source of gas under pressure and including a feed nozzle and a measurement member, a measurement pressure sensor connected to the measurement branch between the feed nozzle and the measurement member, and an absolute pressure sensor connected to the source of gas under pressure and having an input connected to a reference electricity source and an output connected to an input of a differential amplifier having another input connected to the reference electricity source and an output connected to a power supply terminal of the measurement pressure sensor.

Thus, the power supply voltage to the measurement pressure sensor is made to vary linearly as a function of the feed pressure to the measurement device, and the relative residual error therefore varies with the square of the relative variation in the absolute feed pressure.

In an advantageous version of the invention, the device further includes a reference branch connected to the source of gas under pressure and including a feed nozzle and a calibrated leak, and the measurement pressure sensor is a differential pressure sensor connected to the measurement branch and to the reference branch.

In another advantageous aspect of the invention, the device includes an additional corrector circuit disposed on a connection line between the output of the differential amplifier and the input of the measurement pressure sensor, said additional corrector circuit comprising a resistor connected in series in the connection line and a resistor connected in parallel and associated with a setting voltage source. The hyperbola is thus approximated by two straight line segments interconnected by an arc of a curve, thereby increasing the accuracy of the correction performed.

In yet another advantageous aspect of the invention, the device includes a safety circuit comprising a switch associated with a measurement pressure sensor and controlled by a differential amplifier having one input connected to the absolute pressure sensor and having another input connected to a safety reference voltage. Thus, when the feed pressure falls below a threshold determined by the safety reference voltage, operation of the measurement device is interrupted.

BRIEF DESCRIPTION OF THE DRAWING

An embodiment of the invention is described by way of example with reference to the accompanying drawing, in which:

FIG. 1 is a schematic showing the embodiment of the invention with an additional corrector circuit;

FIG. 2 is a graph showing the approximation performed by the device of the invention without the additional corrector circuit; and FIG. 3 is a graph showing the approximation performed with the device of the invention and an additional corrector circuit.

DETAILED DESCRIPTION

With reference to FIG. 1, the measurement device of the invention comprises: a source of gas under pressure formed by an expander 1 associated with a duct for feeding gas under pressure; a reference branch 2 connected to the source of gas under pressure and including a feed nozzle 26 and a calibrated leak 3 of adjustable section; a measurement branch 4 connected to the source of gas under pressure in parallel with the reference branch 2 and including a feed nozzle 27; and a measurement member 5. In the embodiment shown, the measurement member 5 has two diametrically opposite measurement nozzles 6. The reference branch 2 and the measurement branch 4 are connected to a differential measurement pressure sensor 7 having an outlet line 9 delivering an electrical measurement signal as a function of the value of the pressure difference at the pneumatic inlet of the measurement pressure sensor 7 and of a power supply voltage V conveyed to the measurement pressure sensor 7 by a connection line 10 connected to the output of a differential amplifier 11 having one input connected to a reference electricity feed source 12 and having another input connected to the output of an absolute pressure sensor 13 which is connected to the source of gas under pressure 1.

An additional corrector circuit given overall reference 15 is disposed on the connection line 10 between the output of the differential amplifier 11 and the input of the measurement pressure sensor 7. This corrector circuit 15 includes a resistor 16 connected in series in the connection line 10 and a resistor 17 connected in parallel and associated with a setting reference voltage 18 provided in this case by a zener diode.

In addition, the device shown includes a safety circuit comprising a switch 19 connected in series in the output line from the measurement pressure sensor 7 and controlled by a differential amplifier 20 having one input connected to the absolute pressure sensor 13 and another input connected to a safety reference voltage 21.

The measurement device of the invention operates as follows: when the feed pressure is zero or too low, atmospheric pressure or a pressure close to atmospheric exists both in the reference branch 2 and in the measurement branch 4, such that the measured pressure difference is substantially zero even if the measurement nozzle 5 is disposed facing a piece having a manifestly bad dimension. It is then desirable for the measurement device to be out of service. The device is taken out of service by the differential amplifier 20 which causes the switch 19 to open. When the feed pressure is greater than a threshold given by the safety reference voltage 21, then the pressure sensor 13 transmits a signal to the differential amplifier 20 that is high enough to cause the switch 19 to be closed. The differential measurement pressure sensor 7 then performs its normal measurement function. In the event of a change in the feed pressure, the absolute pressure sensor 13 delivers signals which are processed by the differential amplifier 11 and by the additional corrector circuit 15 such that the power supply voltage to the measurement pressure sensor 7 varies in compliance with equations shown in FIG. 3 by straight line segments 22 interconnected by a length of arc 24. The straight line segments 22 and the length of arc 24 constitute an approximation to the hyperbola 23 which represents the product of the power supply voltage to the measurement pressure sensor 7 multiplied by the feed pressure of the device remaining constant.

A less expensive device is obtained by omitting the additional corrector circuit 15, in which case the power supply voltage to the measurement pressure sensor 7 varies linearly as a function of the feed pressure as shown by the straight line 25 in FIG. 2. For an initial pressure Po of the pressure feed at the moment the device is calibrated on the reference piece, the initial power supply voltage to the measurement pressure sensor 7 has a value Vo giving a point in FIG. 2 that corresponds to a point of tangency between the straight line 25 and the hyperbola 23.

Naturally the invention is not limited to the embodiment described and variants could be applied thereto without going beyond the ambit of the invention. In particular, the zener diode 18 of the corrector circuit could be replaced by some other setting voltage reference, said setting voltage reference co-operating with the resistances of the resistors 16 and 17 to determine the positions of the straight line segments 22 relative to the hyperbola 23.

It is also possible to place the switch of the safety circuit 19 in the power supply line to the measurement pressure sensor 7, since this sensor cannot provide a signal unless it is powered. It is also possible to provide a connection between an input of the differential amplifier 20 and the output of the differential amplifier 11 or any other point on the circuit representative of the signal delivered by the absolute pressure sensor 13.

Although the device of the invention is shown in its preferred embodiment with a differential measurement pressure sensor disposed between the reference branch and the measurement branch, a device can be obtained that is cheaper while nevertheless giving good results by omitting the reference branch and by using a simple measurement pressure sensor connected solely to the measurement branch. The signal provided by the measurement pressure sensor 7 is then directly representative of the dimension of the measured piece.

We claim:

1. A device for measuring a dimension by pneumatic means, the device comprising a source of gas under pressure, a measurement branch connected to the source of gas under pressure and including a feed nozzle and a measurement member, and a measurement pressure sensor connected to the measurement branch between the feed nozzle and the measurement member, wherein the device includes an absolute pressure sensor connected to the source of gas under pressure and having an input connected to a reference electricity source and an output connected to an input of a differential amplifier having another input connected to the reference electricity source and an output connected to a power supply terminal of the measurement pressure sensor.

2. A device according to claim 1, further including a reference branch connected to the source of gas under pressure and including a feed nozzle and a calibrated leak, and wherein the measurement pressure sensor is a differential pressure sensor connected to the measurement branch and to the reference branch.

3. A pneumatic measurement device according to claim 1, including an additional corrector circuit disposed on a connection line between the output of the differential amplifier and the input of the measurement pressure sensor, said additional corrector circuit comprising a resistor connected in series in the connection line and a resistor connected in parallel and associated with a setting voltage source.

4. A pneumatic measurement device according to claim 1, including a safety circuit comprising a switch associated with a measurement pressure sensor and controlled by a differential amplifier having one input connected to the absolute pressure sensor and having another input connected to a safety reference voltage.

* * * * *